United States Patent [19]

Tatsumoto et al.

[11] 4,117,098
[45] Sep. 26, 1978

[54] PROCESS FOR MANUFACTURING A CARBONACEOUS MATERIAL

[75] Inventors: Katsunobu Tatsumoto, Tokyo; Kenji Fukuda, Omuta, both of Japan

[73] Assignees: Mitsui Mining Company, Limited; Mitsui Coke Co., Ltd., both of Tokyo, Japan

[21] Appl. No.: 701,409

[22] Filed: Jun. 30, 1976

[30] Foreign Application Priority Data

Aug. 4, 1975 [JP] Japan .................................. 50-94228

[51] Int. Cl.$^2$ ..................... C01B 31/04; C10B 53/08; C10B 53/04
[52] U.S. Cl. .................................... 423/448; 201/6; 201/8; 201/21; 201/24
[58] Field of Search ..................... 201/5, 6, 8, 21–24; 208/8, 45; 423/449, 448

[56] References Cited

U.S. PATENT DOCUMENTS

| | | | |
|---|---|---|---|
| 3,043,753 | 7/1962 | Destremps et al. | 201/5 X |
| 3,112,181 | 11/1963 | Petersen et al. | 201/35 |
| 3,503,864 | 3/1970 | Nelson | 208/8 X |
| 3,523,886 | 8/1970 | Gorin et al. | 208/8 |
| 3,671,401 | 6/1972 | Gorin | 201/6 X |
| 3,884,796 | 5/1975 | Hinderliter et al. | 208/8 |
| 3,960,704 | 6/1976 | Kegler et al. | 423/448 |
| 3,966,585 | 6/1976 | Gray et al. | 208/8 |
| 3,970,541 | 7/1976 | Williams et al. | 208/8 |
| 3,980,447 | 9/1976 | Franke et al. | 201/6 |
| 3,997,422 | 12/1976 | Bull et al. | 208/8 |
| 4,029,749 | 6/1977 | Murakami | 423/448 |

*Primary Examiner*—Morris O. Wolk
*Assistant Examiner*—Michael S. Marcus
*Attorney, Agent, or Firm*—Bacon & Thomas

[57] ABSTRACT

Process for manufacturing an isotropic carbonaceous material having a high density and a high crushing strength which comprises the steps of (a) extracting a reformed coal from at least one component selected from the group consisting of brown coal, lignite and grass peat in the presence of hydrogen gas; (b) heating the reformed coal to produce a green coke; and (c) coking the green coke.

13 Claims, No Drawings

PROCESS FOR MANUFACTURING A CARBONACEOUS MATERIAL

BACKGROUND OF THE INVENTION

This invention relates to a process for manufacturing a carbonaceous substance and, more particularly, for manufacturing an isotropic carbonaceous substance having a high density.

It is an obvious fact that the fundamental properties and the structure of a carbonaceous substance are for the most part determined at an early stage of carbonization which is performed at a temperature between 300° C. and 500° C. That is to say, the fundamental properties of the carbonaceous substance are determined beginning with the stage of an intermediate product, the so called mesophase, which can be observed with polarized light by means of a polarizing microscope at an early stage of carbonization.

The properties of the carbonaceous product apparently depend on the condition of thermal treatment under which the intermediate product is produced. For example, in order to obtain a carbonaceous substance having good graphitization, i.e., so called soft carbon, it is necessary to select a raw material from which a spherical liquid crystalline intermediate product (mesophase) [A] is made at an early state of carbonization after which a substance having an ordered planar structure of condensed aromatic rings [B] is formed by the coalescence of [A] and finally such that a substance having a large fibrous texture [C] is made by the growth of [B]. In addition, proper selection is necessary of the conditions of the thermal treatment. For the aforesaid reason, in order to obtain a carbonaceous substance with the desirable structure and properties for graphitization, it is necessary to select the raw material and the conditions of thermal treatment thereof satisfactory to make the suitable intermediate product (mesophase).

The following methods have generally been proposed as processes for manufacturing an isotropic carbonaceous substance of high density. In accordance with one of these methods, petroleum coke is crushed into particles of 10 $\mu$ diameter or less, the crushed coke is molded with a binder, the molded body is treated thermally followed by impregnation with a pitch oil, and the resulting impregnated article is then treated thermally in repeated fashion. Thus, this method requires a very complex process as described above, and therefore, the manufacturing cost is very high. Recently, another process of manufacturing an isotropic carbonaceous substance with high density has been developed, which comprises treating coal tar pitch or residues from vacuum distillation of petroleum oil at a temperature between 300° C. and 500° C. for a few hours to produce an intermediate product (mesophase), extracting the said mesophase at an early stage of carbonization with a solvent having a high boiling point and then carbonizing or graphitizing the said mesophase after molding without a binder. But, in this method, fine particles of the mesophase obtained by the extraction are bonded to each other by the fusion of the fine particles during the carbonization step. Thus, a countermeasure to protect against this bonding is necessary. For example, a method is known wherein carbon black having finer particles than those of the intermediate product (mesophase) is coated on the surface of the intermediate product (mesophase), and another method is known wherein a matrix portion attached to the intermediate product is washed several times in order to remove the matrix portion, which causes the particles to separate. But, according to the above methods, a complex process is necessary and has the disadvantage that the yield of product based on the raw material is low.

Also, mosaic crystal having a small structural unit is observed with polarized light under a polarizing microscope at an early stage of carbonization of a coal such as one having low rank of coalification, for example, Akahira coal and Taiheiyo coal in Japan. The presence of ashes in the coal is considered as one of the causes for the formation of mosaic crystal. Moreover, it is considered as another important cause of forming mosaic crystal that the bridge formation by hetero atoms (O, N and S) in coal obstructs the planer orientation of the aromatic rings. It is also true that the lower rank of coalification, the smaller is the unit of mosaic crystal at the early stage of carbonization. This is considered to be attributable to the fact that the lower the rank of coalification, the richer is the content of hetero atoms (O, N and S) in the coal, and the richer is the aliphatic substance and, therefore, bridge formation is greater.

SUMMARY OF THE INVENTION

Accordingly, it is the object of this invention to provide an improved process for manufacturing an isotropic carbonaceous substance which is very important as a material for nuclear reactors or for electrodes.

Another object of this invention is to provide an improved manufacturing process using as a starting material coal of a lower rank of coalification than a sub-bituminous C coal (ASTM), such as brown coal, lignite or grass peat which is an abundant natural resource and an inexpensive raw material.

A further object of this invention is to provide an improved manufacturing process wherein the manufacturing cost is very low because of the simplicity of the process and because of a high product yield with respect to the raw material.

In accomplishing the foregoing objects, there has been provided in accordance with this invention, a process according to which organic substances in a coal such as one having a low rank of coalification are extracted with a solvent to obtain the organic substance, the extract is treated thermally, whereby the intermediate product with the unit of fine structure is obtained with high yield productivity. Moreover, when brown coal, lignite, grass peat or the like is dissolved in a suitable solvent in the presence or absence of hydrogen, mineral matters and insoluble organic substances may be separated as a solid phase from the liquid phase. The liquid phase of de-ashed solution is carbonized to produce finally an isotropic carbonaceous substance having a high density.

Coal used as the starting material in this invention is that having a lower rank of coalification than a sub-bituminous C coal, such as brown coal, lignite, grass peat or the like.

Other objects, features and advantages of this invention will become more apparent from the following description of preferred embodiments.

DETAILED DESCRIPTION OF PREFERRED EMBODIMENTS

The present invention is directed to the process for manufacturing a carbonaceous substance and more particularly for manufacturing an isotropic carbonaceous substance having high density and high crushing strength.

The starting material coal described above is crushed into suitable particles and is then caused to be dispersed into an aliphatic and/or aromatic hydrocarbon solvent having a boiling point of above about 150° C., preferably from about 150° C. to 400° C. The ratio of said coal and said solvent (by weight) is between about 1:1 and 1:10, preferably from about 1:2 to 1:7. The dispersion is then subjected to thermal dissolution at a temperature between about 300° C. and 500° C. and under a gas pressure of between about 3 kg/cm² and 100 kg/cm². The higher the partial pressure of hydrogen in the gas, the more enhanced is the dissolution, and therefore the rate of dissolution becomes more rapid. Hydrogen, an inert gas or coke oven gas may be used as the gas. The residence time of the thermal dissolution treatment is variable according to the coal used and usually is selected to be between about 10 and 240 minutes so that the slurry has a viscosity lower than 10 c.p. (at 60° C.), preferably lower than 2 c.p. (at 60° C.), which can be filtered easily.

After dissolution of coal, undissolved residues are removed from the liquified coal solution by filtration or centrifugation, and filtrate is distilled at a suitable temperature, generally between about 250° C. and 450° C. The solvent is recovered by distillation and it is used as a recycled oil to this process.

The residue from the distillation process, namely, solvent-extracted coal, is used as the raw material for producing an isotropic carbonaceous substance having high density according to the invention.

Next, this extracted coal is treated thermally at a temperature between about 300° C. and 500° C., preferably between about 430° C. and 450° C., for a period of between about 30 minutes and 240 minutes. The thermal treatment is preferably conducted in an inert gas atmosphere so as to prevent the oxidation of the extracted coal. Then a green coke is obtained, between about 90 and 98% of which is insoluble in benzene, and between about 60 and 85% of which is insoluble in quinoline.

A mosaic structure of a very fine structural unit which is less than 1 $\mu$ diameter is observed in the green coke with polarized light under a polarization microscope. This green coke is crushed into particles of 200 $\mu$ or less and is molded without a binder, and the resulting product is then treated at a higher temperature generally above about 750° C. and typically between about 750° C. and 1300° C., whereby the desired carbonaceous material is obtained. The heat treatment is generally carried out for periods of time between about 20 and 400 hours. A linear temperature program rate of between about 40 and 200° C./hr. is suitably employed. Although the size of the particles is 200 $\mu$ or less before molding, the carbonaceous material hereof has a very fine mosaic structure, a lesser degree of anisotropy, a large crushing strength, a large true specific gravity and a high bulk density.

The carbonized material may subsequently be graphitized by heating at still a more elevated temperature, for example, a temperature between about 2800° C. and 3000° C. The time for this treatment is typically between about 20 and 80 hours.

For the purpose of further elucidating the present invention, a description will now be given hereinbelow in terms of several illustrative examples.

EXAMPLE 1

Lignite having 3.4% ash is dissolved in an amount of a middle cut oil (from coal tar) 3 times the weight of the lignite and is then treated under a nitrogen pressure of 8 kg/cm² and a temperature of 400° C. for a period of 240 minutes. The solid phase is separated from the liquid phase by filtration. The solvent is recovered from the filtrate by distillation and extracted de-ashed coal obtained. The yield of the solvent-extracted coal is 78% of the raw material (as DAF coal base). The extracted de-ashed coal is treated in an atmosphere of nitrogen and at a temperature of 450° C. for a period of 30 minutes to obtain green coke, 97% of which is insoluble in benzene and 72% of which is insoluble in quinoline. The resulting green coke is crushed, a portion into particles of 100 $\mu$ and below and another portion into particles of 200 $\mu$ and below, and each portion of the crushed green coke is molded under the pressure of 2 t/cm² in a cylinder of 25 mm diameter. Each of the molded products is subjected to carbonization at a temperature of 1000° C. for a period of 48 hrs. (linear temperature program rate is 60° C./hr.). The true specific gravity and the crushing strength of each of the carbonized blocks is shown in Table 1.

TABLE 1

| Diameter of the particles before molding | Bulk specific gravity (g/cm³) | True specific gravity (Butanol immersion method $d_4^{25}$) | Crushing strength (t/cm²) |
|---|---|---|---|
| 200 $\mu$ and less | 1.64 | 1.85 | //2.84 ⊥2.88 |
| 100 $\mu$ and less | 1.65 | 1.85 | //2.95 ⊥2.87 |

//Crushing strength at a parallel direction to pressing direction during molding.
⊥Crushing strength at a perpendicular direction to pressing direction during molding.

The properties of a graphitized block produced from the respective carbonized block by graphitization at a temperature of 2800° C. for a period of 24 hrs. are shown in Table 2.

TABLE 2

| Diameter of the particles before molding | Bulk specific gravity (g/cm³) | True specific gravity (Butanol immersion method $d_4^{25}$) | Crushing strength (t/cm²) |
|---|---|---|---|
| 200 $\mu$ and less | 1.85 | 2.22 | //1.55 ⊥1.55 |
| 100 $\mu$ and less | 1.86 | 2.22 | //1.58 ⊥1.57 |

//Crushing strength at a parallel direction to pressing direction during molding.
⊥Crushing strength at a perpendicular direction to pressing direction during molding.

EXAMPLE 2

A brown coal having 5.1% ash is dissolved in an amount of middle cut oil (from coal tar) 4 times the weight of the brown coal, and the solution is treated under a pressure of coke oven gas of 70 kg/cm² (the partial pressure of hydrogen is 28 kg/cm²) and at a temperature of 400° C. for a period of 2 hrs., and then the solid phase is separated from the liquid phase by filtration. The solvent is recovered from the filtrate by distillation and an extracted de-ashed coal is obtained. The yield of extracted coal is 82% of the raw material (D.A.F. coal base). The extracted coal is treated at a temperature of 450° C. in an atmosphere of nitrogen for a period of 42 minutes, whereupon green coke is obtained, 98% of which is insoluble in benzene and 71% of which is insoluble in quinoline. This green coke is crushed into the particles of 100 μ and below, and is molded under a pressure of 2 t/cm² in a cylinder of 25 mm diameter. The molded product is subjected to carbonization in an atmosphere of nitrogen and at a temperature of 1000° C. for a period of 48 hrs. (linear temperature program rate is 60° C./hr.). The bulk and true specific gravity and the crushing strength of the carbonized blocks are as shown in Table 3.

TABLE 3

| Bulk specific gravity (g/cm³) | True specific gravity (Butanol immersion method) ($d_4^{25}$) | Crushing Strength (t/cm²) |
| --- | --- | --- |
| 1.65 | 1.86 | //2.88 ⊥2.96 |

//Crushing strength at a parallel direction to pressing direction during molding.
⊥Crushing strength at a perpendicular direction to pressing direction during molding.

The properties of a graphitized block produced from the carbonized block by graphitization at a temperature of 2800° C. for a period of 24 hrs. are shown in Table 4.

TABLE 4

| Bulk specific gravity (g/cm³) | True specific gravity (Butanol immersion method) ($d_4^{25}$) | Crushing Strength (t/cm²) |
| --- | --- | --- |
| 1.86 | 2.21 | //1.55 ⊥1.54 |

//Crushing strength at a parallel direction to pressing direction during molding.
⊥Crushing strength at a perpendicular direction to pressing direction during molding.

EXAMPLE 3

Grass peat having 10.8% ash is dissolved in an amount of a middle cut oil (from coal tar) 6 times the weight of grass peat and is treated under a pressure of hydrogen of 60 kg/cm² and at a temperature of 440° C. for a period of 120 minutes. The solid phase is separated from the liquid phase by filtration. The solvent is recovered from the filtrate by distillation and extracted de-ashed coal is obtained. The yield of the extracted de-ashed coal is 90% of the raw material (as DAF coal base). The said de-ashed coal is treated in the atmosphere of nitrogen and at a temperature of 420° C. for a period of 90 minutes to obtain green coke, 96% of which is insoluble in benzene and 70% of which is insoluble in quinoline.

The green coke is crushed, and then one part by weight of particles between 100 μ and 250 μ, 2 parts by weight of particles between 50 μ and 100 μ, and 3 parts by weight of particles of 50 μ and below are blended. The blended green coke is molded under a pressure of 1.5 t/cm² in a cylinder of 25 mm diameter. The molded product is subjected to carbonization at a temperature of 1000° C. for a period of 48 hrs. (linear temperature program rate is 60° C./hr.). The bulk and true specific gravity and the crushing strength of the carbonized blocks are shown in Table 5.

TABLE 5

| Bulk specific gravity (g/cm³) | True specific gravity (Butanol immersion method) $d_4^{25}$ | Crushing Strength (t/cm²) |
| --- | --- | --- |
| 1.66 | 1.86 | //2.96 |

TABLE 5-continued

| Bulk specific gravity (g/cm³) | True specific gravity (Butanol immersion method) $d_4^{25}$ | Crushing Strength (t/cm²) |
| --- | --- | --- |
|  |  | ⊥2.80 |

//Crushing strength at a parallel direction to pressing direction during molding.
⊥Crushing strength at a perpendicular direction to pressing direction during molding.

The properties of a graphitized block produced from the carbonized block by graphitization at a temperature of 2800° C. for a period of 24 hrs. are shown in the Table 6.

TABLE 6

| Bulk specific gravity (g/cm³) | True specific gravity (Butanol immersion method) ($d_4^{25}$) | Crushing Strength (t/cm²) |
| --- | --- | --- |
| 1.84 | 2.22 | //1.56 ⊥1.57 |

//Crushing strength at a parallel direction to pressing direction during molding.
⊥Crushing strength at a perpendicular direction to pressing direction during molding.

COMPARATIVE EXAMPLE A

Petroleum coke is carbonized at a temperature of 1400° C. and then crushed. One part by weight of particles between 10 μ and 50 μ, 9 parts by weight of particles of 10 μ and below, and 3 parts by weight of coal tar pitch as binder are blended. The blended mixture hereof is molded under a pressure of 1.5 t/cm² in a cylinder of 25 mm diameter. The molded product is subjected to carbonization at a temperature of 1000° C. for a period of 48 hrs. (linear temperature program rate is 60° C./hr.). The bulk and true specific gravity, and the crushing strength of the carbonized block by a usual method are shown in the Table 7.

TABLE 7

| Bulk specific gravity (g/cm³) | True specific gravity (Butanol immersion method) ($d_4^{25}$) | Crushing Strength (t/cm²) |
| --- | --- | --- |
| 1.59 | 1.84 | //1.60 ⊥2.20 |

//Crushing strength at a parallel direction to pressing direction during molding.
⊥Crushing strength at a perpendicular direction to pressing direction during molding.

The properties of a graphitized block produced from the carbonized block by graphitization at a temperature of 2800° C. for a period of 24 hrs. are shown in Table 8.

TABLE 8

| Bulk specific gravity (g/cm³) | True specific gravity (Butanol immersion method) ($d_4^{25}$) | Crushing Strength (t/cm²) |
| --- | --- | --- |
| 1.80 | 2.21 | //1.0 ⊥1.5 |

//Crushing strength at a parallel direction to pressing direction during molding.
⊥Crushing strength at a perpendicular direction to pressing direction during molding.

COMPARATIVE EXAMPLE B

Miike coal (Caking Coal) having 7.6% ash is dissolved in 3 times its weight in a middle cut oil (from coal-tar) and is treated under a pressure of hydrogen of 60 kg/cm² and at a temperature of 400° C. for a period of 120 minutes. The solid phase is separated from the liquid phase by filtration. The solvent is recovered from the filtrate by distillation and extracted de-ashed coal is obtained. The yield of the said de-ashed coal is 94% of the raw material (as D.A.F. base).

The de-ashed coal is treated in an atmosphere of nitrogen and at a temperature of 450° C. for a period of 40 minutes to obtain green coke, 97% of which is insoluble in benzene and 71% of which is insoluble in quinoline. This green coke is crushed into particles of 100 μ and below and is molded under a pressure of 2 t/cm² in a cylinder of 25 mm diameter.

The molded product is subjected to carbonization in the atmosphere of nitrogen and at a temperature of 1000° C. for a period of 24 hrs. (linear temperature program rate is 60° C./hr.). The bulk and true specific gravity, and crushing strength of the carbonized block are shown in the Table 9.

TABLE 9

| Bulk specific gravity (g/cm³) | True specific gravity (Butanol immersion method) ($d_4^{25}$) | Crushing Strength (t/cm²) |
|---|---|---|
| 1.50 | 1.75 | //1.50 ⊥2.11 |

//Crushing strength at a parallel direction to pressing direction during molding.
⊥Crushing strength at a perpendicular direction to pressing direction during molding.

The properties of a graphitized block produced from the carbonized block by graphitization at a temperature of 2800° C. for a period of 24 hrs. are shown in the Table 10.

TABLE 10

| Bulk specific gravity (g/cm³) | True specific gravity (Butanol immersion method) ($d_4^{25}$) | Crushing Strength (t/cm²) |
|---|---|---|
| 1.79 | 2.22 | //0.9 ⊥1.2 |

//Crushing strength at a parallel direction to pressing direction during molding.
⊥Crushing strength at a perpendicular direction to pressing direction during molding.

What is claimed is:

1. A process for manufacturing an isotropic carbonaceous substance having a high density and a high crushing strength, which comprises the steps of (a) extracting organic components from at least one coal component of a lower rank of coalification than a sub-bituminous C coal by means of a solvent to produce a solvent-containing extract; (b) removing said solvent from said extract and (c) heating said extract at a temperature not exceeding 450° C. for a period of time sufficient to produce an istropic green coke which is 90 to about 98% insoluble in benzene and about 60 to about 85% insoluble in quinoline.

2. The process according to claim 1, wherein said step of extracting comprises the sub-steps of dissolving said coal component in said solvent and separating undissolved residues from the solution.

3. The process according to claim 1, wherein said solvent has a boiling point higher than about 150° C.

4. The process according to claim 1, wherein said step of heating the extract is carried out at a temperature of between about 300° and 450° C. for a period of time between about 30 and 240 minutes.

5. The process according to claim 3, wherein the solvent is a fraction boiling between about 150° C. and 400° C.

6. The process according to claim 1, wherein the extraction step is carried out under a hydrogen pressure of between about 3 kg/cm² and 100 kg/cm² a temperature of between about 300° C. and 500° C. and for a period of extraction of between 10 min. and 240 min.

7. The process according to claim 6, wherein the ratio of said coal component and said solvent (by weight) is between about 1:1 and about 1:10 during said extraction step.

8. The process according to claim 1, further comprising the step of carbonizing said green coke at the temperature of between about 750° C. and 1300° C.

9. The process according to claim 8, further comprising the steps of crushing said green coke to form particles with the diameter of 200 μ and below and molding said particles under pressure before carbonizing.

10. The process according to claim 8, wherein a linear temperature program rate of between about 40° C./hr. and 200° C./hr. is employed.

11. The process according to claim 6, further comprising the step of graphitizing said carbonized coke at a temperature of between about 2800° C. and 3000° C.

12. The process according to claim 1, further comprising the step of recovering said solvent removed from the extract.

13. The process according to claim 1, wherein said at least one coal component is selected from the group consisting of brown coal, lignite and grass peat.

* * * * *